(12) United States Patent　　(10) Patent No.: US 7,382,241 B1
Huang et al.　　(45) Date of Patent: Jun. 3, 2008

(54) VEHICLE LED TAIL-LIGHT BULB

(76) Inventors: Zhen Qiu Huang, 768 S. Turnbull Canyon Rd., City of Industry, CA (US) 91745; Sam Fu, 768 S. Turnbull Canyon Rd., City of Industry, CA (US) 91745

( * ) Notice: Subject to any disclaimer, the term of this patent is extended or adjusted under 35 U.S.C. 154(b) by 146 days.

(21) Appl. No.: 11/243,917

(22) Filed: Oct. 6, 2005

(51) Int. Cl.
*B60Q 1/34* (2006.01)
(52) U.S. Cl. ..................................... 340/475; 362/545
(58) Field of Classification Search ................ 340/468, 340/475, 479; 362/545; 315/77
See application file for complete search history.

(56) References Cited

U.S. PATENT DOCUMENTS 6,786,625 B2 * 9/2004 Wesson ...................... 362/545
2004/0095234 A1 * 5/2004 Sugimoto et al. ........... 340/475
2004/0257214 A1 * 12/2004 Smithson .................... 340/468

* cited by examiner

*Primary Examiner*—Thomas Mullen
(74) *Attorney, Agent, or Firm*—Albert O. Cota

(57) ABSTRACT

A vehicle LED tail-light bulb (10) that is designed to replace an incandescent light bulb, to be inserted into a conventional right and left vehicle light socket and to function in combination with a vehicle battery that powers the bulb (10) and a flasher unit that is activated by a vehicle turn-signal arm. The LED tail-light bulb incorporates an electronics circuit consisting of an input circuit (12), an intermediate circuit (14) and an output circuit (16). The electronics circuit is designed to operate the left and right turn lights and in some cases an emergency light and to produce a current flow of sufficient magnitude to energize the vehicle flasher unit. The energized flasher unit then causes the bulb (10) to blink when the vehicle turn-signal arm is placed in either a right turn or a left turn position.

19 Claims, 2 Drawing Sheets

VEHICLE LED TAIL-LIGHT BULB

TECHNICAL FIELD

The invention pertains to the general field of vehicle left and right turn lights, and emergency flashing lights and more particularly to a vehicle LED tail-bulb that produces sufficient current to allow the vehicle left and right turn and emergency lights to illuminate and to blink.

BACKGROUND ART

High-intensity LED lights in vehicles are in common use because LED lights are reliable, cost-effective and they produce a greater light output using less power than conventional single or dual-filament incandescent lights. Additionally, LED lights require less space and have a longer useful life when compared to incandescent lights.

The prior art LED light bulbs operate in combination with a flasher unit which causes the lights to turn ON and OFF whenever the right or left turn signal arm or the emergency flasher button is depressed. The flasher unit is constructed using a set of contacts similar to a conventional relay with one exception. One of the relay support arms is made of a bimetallic material similar to the contacts in a home thermostat. The two metals that comprise the bimetallic material have different temperature coefficient characteristics. Thus, when the contacts are heated or cooled they expand or contract at different rates.

The flasher unit installed in a vehicle becomes operational when the current for the filament type lights flows through a heater coil mounted against the contacts in the flasher unit. When the turn signal is turned ON the heater coil heats the contacts causing one of the metal contacts to heat, which in turn causes it to bend. This action either OPENS or CLOSES the relay contacts of the flasher unit. Once the contacts OPEN current stops flowing to the lights and they turn OFF. The bimetallic metal cools and it bends back to its original shape closing the contacts in the flasher unit and the cycle repeats. This action makes the turn signal lights and the emergency light blink ON and OFF.

The flasher unit is designed so that the current from two or more lights is necessary to make it work. One light does not draw enough current to heat the metal enough to make it bend. The same problem arises when you try to substitute a low power LED light in place of a conventional filament light. They do not draw enough current to activate the flasher unit.

The instant invention eliminates this problem by allowing for the direct substitution of an LED light bulb for a conventional one or two filament light, while still enabling the flasher unit to function normally. This is accomplished by emulating the current drawn by a conventional filament light. To do this a circuit is placed in parallel across the LED light bulb which then causes the light bulb to draw additional current making the flasher unit function normally.

A search of prior art patents and industry literature did not disclose any products that read on the claims of the instant invention.

DISCLOSURE OF THE INVENTION

The vehicle LED tail-light bulb is designed to directly replace a single filament or a dual-filament incandescent tail-light bulb. The LED light bulb functions in combination with:

a) a corresponding set of right and left vehicle tail-light sockets,
b) a vehicle battery that powers the LED tail-light bulb, and
c) vehicle flasher unit that is energized when a vehicle turn-signal arm is placed in either a right turn or a left turn position.

The LED tail-light bulb comprises an electronic circuit having means for producing a current of sufficient magnitude to energize the vehicle flasher unit which then allows the LED tail-lights to illuminate and blink.

The electronics circuit in a preferred first design is comprised of an input circuit, an intermediate circuit and an output circuit.

The input circuit includes a connector J1 that is configured with four contacts that can be arranged to correspond to the number of contacts on a vehicle light socket that accepts either an XC-1156W, an XL-1156W, an XC-1157W or an XL-1157W light bulb.

The intermediate circuit in combination with the input circuit controls and produces an optimized current that is applied to a set of twelve LEDs that are connected in a series/parallel configuration.

The electronic circuit in combination, produces the required current to operate the vehicle LED tail-light bulbs.

In view of the above disclosure it is the primary object of the invention to produce a vehicle LED tail-light bulb that can directly replace a single or dual-filament incandescent bulb. The LED tail-light bulb allows a conventional vehicle flasher to function and operate the inventive bulb.

In addition to the primary object of the invention it is also an object to produce a vehicle LED tail-light bulb that:
can be designed to replace various designs of single or dual-filament incandescent bulbs,
has a long useful life,
is reliable with a high Mean-Time-Between-Failure (MTBF),
can be designed with various bulb designs, and
is cost effective from both a manufacturer's and consumer's point of view.

These and other objects and advantages of the present invention will become apparent from the subsequent detailed description of the preferred embodiment and the appended claims taken in conjunction with the accompanying drawings.

BEST MODE FOR CARRYING OUT THE INVENTION

The best mode for carrying out the invention is presented in terms of a preferred embodiment for a vehicle LED tail-light bulb that is presented in two design configurations. Each design of the LED tail-light bulb 10 (hereinafter "LTLB 10") is designed to replace a conventional single filament or dual-filament incandescent tail-light bulb that is not shown. The LTLB 10 functions in combination with a corresponding set of right and left vehicle tail-light sockets, a vehicle battery that supplies 12-volts d-c that powers the LTLB 10 and a flasher unit that is energized when a vehicle turn signal arm is placed in either a right or a left turn position. The flasher unit typically includes a set of bimetallic contacts that close when they are heated by a juxtaposed heating element, thus causing the LTLB 10 to blink until the contacts cool, at which time the bulb stops blinking.

Figure 1:
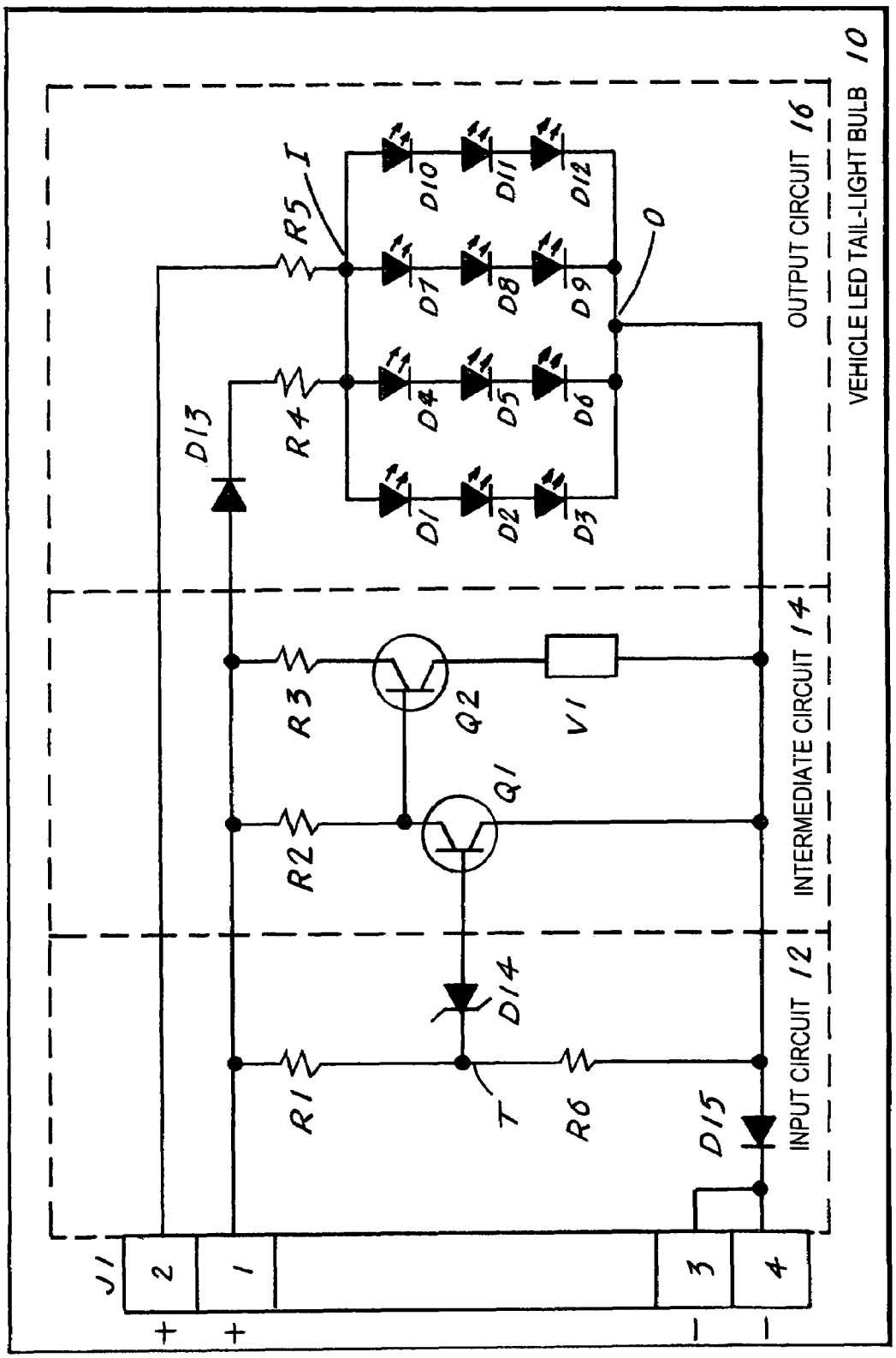
FIG. 1 is a schematic diagram of a first design for a vehicle LED tail-light bulb.

The first design configuration of the LTLB 10, as shown in FIG. 1, is operated by an electronics circuit that is comprised of an input circuit 12, an intermediate circuit 14 and an output circuit 16. The electronics circuit is designed to be enclosed within the envelope of tail-light bulb that can be tinted in a selectable color.

The input circuit 12 is comprised of a connector J1 that is dimensioned to be inserted into one of the vehicle's conventional light sockets. The connector J1 has a pin 1 that is connected to the 12-volts d-c, a pin 2 also connected to the 12-volts d-c, and a pin 3 and 4 that are connected to circuit ground. The 12-volts d-c on pin 1 is present only when the vehicle brake pedal is depressed or when the vehicle turn signal lever is placed in either a right turn or a left turn position. The four contacts of the connector J1 are arranged to correspond with the contacts on the socket which accepts either an XC-1156W light bulb, an XL-1156W light bulb, an XC-1157W light bulb, or an XL-1157W light bulb or the like.

The circuit 12 includes a voltage divider, as shown in FIG. 1, that consists of resistors R1 and resistor R6, wherein resistor R1 has a first end and a second end, and resistor R2 also has a first end and a second end. The first end of resistor R1 is connected to pin 1 of connector J1, the second end of resistor R1 is connected to the first end of resistor R6 to form a junction T, as also shown in FIG. 1. The second end of resistor R6 is connected to pins 3 and 4 of connector J1 via a protection diode D15 that allows a current from pins 3 and 4 to flow in only one direction.

The final element of the input circuit 12 is a zener diode D14 that has its cathode connected to the junction T of the voltage divider. The voltage at the junction T of the voltage divider is selected to cause the zener diode D14 to conduct and apply a voltage of 2.7 volts d-c to the base of transistor Q1.

The intermediate circuit 14, as shown in FIG. 1, is comprised of comprises a transistor Q1 having a base connected to the anode of the zener diode D14, a collector connected via a current limiting resistor R2, to pin 1 of connector J1, and an emitter connected directly to circuit ground. The circuit 14 also has a second transistor Q2 having a base that is connected to the emitter of transistor Q1 and to pin 1 via the resistor R2, a collector connected to pin 1 via current limiting resistor R3, and an emitter. The transistors Q1 and Q2 are each comprised of an NPN transistor.

The final element of the circuit 14 is a varistor V1 having a first end connected to the emitter of transistor Q2, and a second end connected to circuit ground. The varistor V1 causes the LTLB 10 to draw additional current across pins 1 and 2.

The output circuit 16, as shown in FIG. 1, includes a plurality of LEDs connected in a series/parallel configuration. The plurality of LEDs which typically consists of four LEDs, have an input end I and an output end O, wherein the output end O is connected to circuit ground. The plurality of LEDs preferably is comprised of twelve LEDs, as shown in FIG. 1. However, in some cases eight LEDs can be employed.

The circuit 16 also includes a current limiting resistor R4 having a first end and a second end, where the first end is connected to the cathode of a protection diode D13 and the anode of diode D13 is connected to pin 1 of connector J1. The second end of resistor R4 is connected to the input end I of the plurality of diodes. The final element of the output circuit 16 is a current limiting resistor R5 having a first end connected to pin 2 of connector J1 and a second end connected to the input end I of the plurality of LEDs. When the LTLB 10 replaces a conventional incandescent tail-light bulb, the current drawn by the LED tail-light bulb is of sufficient magnitude to cause the flasher unit to function in a conventional manner.

Figure 2:
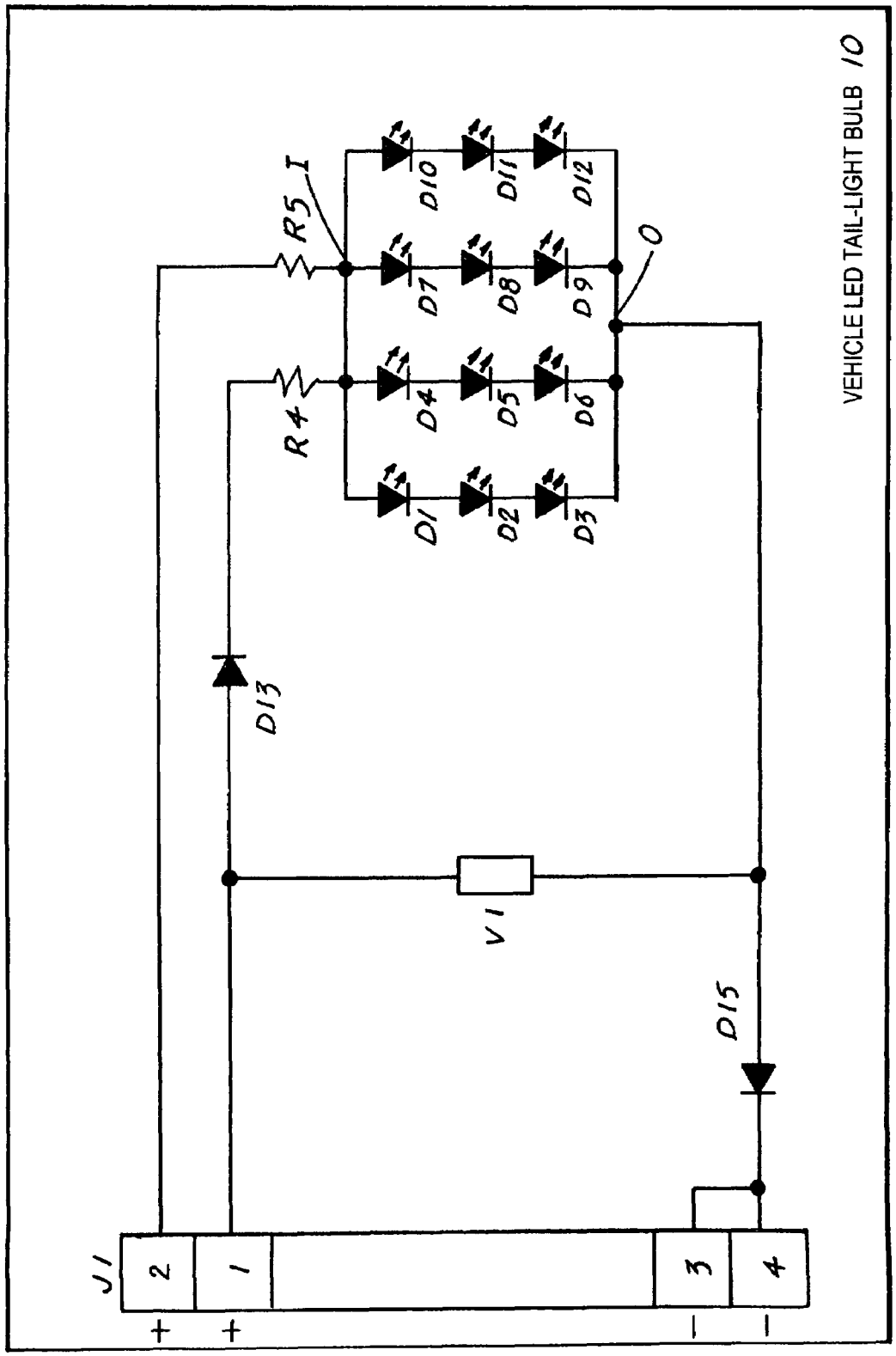
FIG. 2 is a schematic diagram of a second design for a vehicle LED tail-light bulb.

The second design configuration of the LTLB 10, as shown in FIG. 2, functions in a similar manner as described above for the first design configuration. That is, it emulates the current drawn by an incandescent light bulb to allow the flasher unit to become operational.

The second design is operated by an electronics circuit that is comprised of an input connector J1, a varistor V1, a plurality of LEDs D1-D12, a diode D13, a diode D15 and resistors R4 and R5.

The input connector J1, as shown in FIG. 2, is dimensioned to be inserted into one of the vehicle's light sockets. The connector J1 has a pin 1 connected to the 12-volts d-c, a pin 2 also connected to 12-volts d-c, and a pin 3 and pin 4 that are both connected to circuit ground, wherein the 12-volts d-c on pin 1 is present only when the vehicle turn signal arm is placed in either a right turn or a left turn position. The four contacts of the connector J1 are arranged to correspond to the contacts on either an XC-1156W light bulb, an XL-1156W light bulb, an XC-1157W light bulb, or an XL-1157W light bulb.

The varistor V1 has a first end that is connected across pin 1 of connector J1 and the anode of diode D3, and a second end that is connected to circuit ground (pins 3 and 4 of connector J1) via diode D15. The varistor causes the vehicle LED tail-light bulbs to draw additional current across pin 1 and 2 of connector J1.

The plurality of LEDs, which consist of twelve LEDs D1-D12, are connected in a series/parallel configuration and have an input end I and an output end O, as shown in FIG. 2. The output end O is connected to pins 3 and 4 of connector J1 via a protection diode D15 that allows a current from the pins 3 and 4 to flow in only one direction. The current limiting resistor R4 has a first end and a second end. The second end is connected to the input end I and the first end is connected via protection diode D13 to pin 1 of connector J1. The current limiting resistor R5 also has a first end and a second end. The second end is connected to the input end I and the first end is connected to pin 1 of connector J1. When the LTLB 10 replaces a conventional incandescent tail-light bulb, the current drawn by the LED tail-light bulb is of sufficient magnitude to cause the flasher unit to function in a conventional manner.

While the invention has been described in detail and pictorially shown in the accompanying drawings it is not to be limited to such details, since many changes and modifications may be made to the invention without departing from the spirit and the scope thereof. Hence, it is described to cover any and all modifications and forms which may come within the language and cope of the claims.

The invention claimed is:

1. A vehicle LED tail-light bulb that is designed to replace an incandescent tail-light bulb by being inserted into a right or a left vehicle tail-light socket, and that functions in combination with a vehicle battery that powers said LED tail-light bulb, and a vehicle flasher unit that is energized when a vehicle turn-signal arm is placed in either a right turn or a left turn position, wherein said LED tail-light bulb comprises an electronics circuit having means for producing a current of sufficient magnitude to energize the vehicle flasher unit when the vehicle turn-signal arm is placed in either a right turn or left turn position.

2. The vehicle LED tail-light bulb as specified in claim 1 wherein said electronics circuit is enclosed within the envelope of said bulb.

3. The vehicle LED tail-light bulb as specified in claim 2 wherein said electronics circuit is designed to energize a plurality of LEDs.

4. The vehicle LED tail-light bulb as specified in claim 3 wherein said plurality of LEDs is comprised of four LEDs.

5. The vehicle LED tail-light bulb as specified in claim 3 wherein said plurality of LEDs is comprised of twelve LEDs.

6. The vehicle LED tail-light bulb as specified in claim 2 wherein said electronics circuit terminates at a connector (J1) having a set of four contacts.

7. The vehicle LED tail-light bulb as specified in claim 6 wherein said connector (J1) is comprised of four contacts that are arranged to correspond to the contacts on the vehicle tail-light socket which accepts either an XC-1156W light bulb, an XL-1156W light bulb, an XC-1157W light bulb or an XL-1157W light bulb.

8. The vehicle LED tail-light bulb as specified in claim 2 wherein said bulb can be tinted in a selectable color.

9. A vehicle LED tail-light bulb that is designed to replace an incandescent tail-light bulb by being inserted into a right or a left vehicle tail-light socket, and that functions in combination with a vehicle 12-volt battery that powers said LED tail-light bulb, and a vehicle flasher unit that is energized when a vehicle turn signal arm is placed in either a right or a left turn position, wherein the vehicle flasher unit includes a set of bimetallic contacts that close when heated by a juxtaposed heating element, thus causing said LED tail-light bulb to blink until the contacts cool, at which time said bulb stops blinking, wherein said LED tail-light bulb is operated by an electronics circuit comprising:
  a) an input circuit comprising:
    (1) a connector (J1) dimensioned to be inserted into one of the vehicle's light sockets, wherein said connector (J1) has a pin 1 connected to the 12-volt battery, a pin 2 also connected to the 12-volt battery and pins 3 and 4 that are connected to circuit ground, wherein the 12-volts d-c on pin 1 is present only when the vehicle brake pedal is depressed or when the vehicle turn signal arm is placed in either a right turn or a left turn position,
    (2) a voltage divider consisting of a resistor (R1) and a resistor (R6), wherein said resistor (R1) has a first end and a second end, and said resistor (R6) also has a first end and a second end, wherein the first end of said resistor (R1) is connected to pin 1 of said connector (J1), the second end of said resistor (R1) is connected to the first end of said resistor (R6) to form a junction (T), and the second end of said resistor (R6) is connected to pins 3 and 4 of said connector (J1) via a protection diode (D15) that allows a current from pins 3 and 4 to flow in only one direction, a zener diode (D14) having its cathode connected to the junction (T) of the voltage divider,
  b) an intermediate circuit comprising:
    (1) a transistor (Q1) having a base connected to the anode of said zener diode (D14), a collector connected via a current limiting resistor (R2), to pin 1 of said connector (J1), and an emitter connected to circuit ground,
    (2) a transistor (Q2) having a base connected to the collector of said transistor (Q1) and to pin 1 via said resistor (R2), a collector connected to pin 1 via a current limiting resistor (R3), and an emitter,
    (3) a varistor (V1) having a first end connected to the emitter of said transistor (Q2), and a second end connected to circuit ground, wherein said varistor (V1) causes the vehicle LED tail-light bulb to draw additional current across pins 1 and 2,
  c) an output circuit comprising:
    (1) a plurality of LEDs connected in a series/parallel configuration and having an input end (I) and an output end (O), wherein the output end (O) is connected to circuit ground,
    (2) a current limiting resistor (R4) having a first end connected to the cathode of a protection diode (D13), wherein the anode of said diode (D13) is connected to pin 1 of said connector (J1), and a second end connected the input end (I) of said plurality of LEDs and
    (3) a current limiting resistor (R5) having a first end connected to pin 2 of said connector (J1) and a second end connected to the input end (I) of said plurality of LEDs, wherein when said vehicle LED tail-light bulb replaces the incandescent tail-light bulb, the current drawn by the LED tail-light bulb is of sufficient magnitude to cause the flasher unit to function in a conventional manner.

10. The vehicle LED tail-light bulb as specified in claim 9 wherein said connector (J1) is comprised of four contacts that are arranged to correspond with the contacts on the socket which accepts either an XC-1156W light bulb, an XL-1156W light bulb, an XC-1157W light bulb, or an XL-1157W light bulb.

11. The vehicle LED tail-light bulb as specified in claim 9 wherein the voltage at the junction T of the voltage divider is selected to cause the zener diode (D14) to conduct.

12. The vehicle LED tail-light bulb as specified in claim 11 wherein the zener diode (D14) applies a voltage of 2.7 volts d-c to the base of said transistor (Q1).

13. The vehicle LED tail-light bulb as specified in claim 11 wherein said transistor (Q1) is comprised of an NPN transistor.

14. The vehicle LED tail-light bulb as specified in claim 11 wherein said transistor (Q2) is comprised of an NPN transistor.

15. The vehicle LED tail-light bulb as specified in claim 9 wherein said plurality of LEDs is comprised of at least eight LEDs.

16. The vehicle LED tail-light bulb as specified in claim 9 wherein said plurality of LEDs is comprised of twelve LEDs.

17. A vehicle LED tail-light bulb that is designed to replace an incandescent tail-light bulb by being inserted into a right or a left vehicle tail-light socket, and that functions in combination with a vehicle 12-volt battery that powers said LED tail-light bulb, and a vehicle flasher unit that is energized when a vehicle turn signal arm is placed in either a right or a left turn position, wherein the vehicle flasher unit includes a set of bimetallic contacts that close when heated by a juxtaposed heating element, thus causing said LED tail-light bulb to blink until the contacts cool, at which time said bulb stops blinking, wherein said LED tail-light bulb is operated by an electronics circuit comprising:
  a) an input connector (J1) that is dimensioned to be inserted into one of the vehicle's light sockets, wherein said connector (J1) has a pin 1 connected to the 12-volt battery a pin 2 also connected to the 12-volt battery and pins 3 and 4 that are connected to circuit ground, wherein the 12-volts d-c on pin 1 is present only when the vehicle turn signal arm is placed in either a right turn or a left turn position, b) a varistor (V1) having a first end connected across pin 1 of said connector (J1) and a second end connected to circuit ground, wherein the varistor (V1) causes the vehicle LED tail-light bulb to draw additional current across pins 1 and 2 of said connector (J1), c) a plurality of LEDs that are connected in a series/parallel configuration and having an input end (I) and an output end (O), wherein the output end (O) is connected to pins 3 and 4 of said connector (J1) via a protection diode D15 that allows a current from pins 3 and 4 to flow in only one direction, d) a current limiting resistor (R4) having a first end and a second end, wherein the second end is connected to the input end (I) and the first end is connected via a protection diode (D13) to pin 1 of said connector (J1), and e) a current limiting resistor (R5) having a first end and a second end wherein the second end is connected to the input end (I) and the first end is connected to pin 2 of said connector (J1).

18. The vehicle LED tail-light bulb as specified in claim 17 wherein said connector (J1) is comprised of four contacts that are arranged to correspond to the contacts on either an XC-1156W light bulb, an XL-1156W light bulb, an XC-1157W light bulb, or an XL-1157W light bulb.

19. The vehicle LED tail-light bulb as specified in claim 17 wherein said plurality of LEDs is comprised of twelve LEDs.

* * * * *